(12) United States Patent
Shibuya

(10) Patent No.: US 6,779,762 B2
(45) Date of Patent: Aug. 24, 2004

(54) FASTENER FOR LAYING PIPES

(75) Inventor: Seiji Shibuya, Tokyo (JP)

(73) Assignee: Akagi Co., LTD, Tokyo (JP)

( * ) Notice: Subject to any disclaimer, the term of this patent is extended or adjusted under 35 U.S.C. 154(b) by 0 days.

(21) Appl. No.: 10/277,684

(22) Filed: Oct. 23, 2002

(65) Prior Publication Data

US 2004/0026576 A1 Feb. 12, 2004

(30) Foreign Application Priority Data

Aug. 6, 2002 (JP) .................................. P2002-228287

(51) Int. Cl.[7] .............................................. F16L 3/00
(52) U.S. Cl. ...................................................... 248/62
(58) Field of Search ........................... 248/74.1, 62, 60, 248/58, 63, 67.7, 916

(56) References Cited

U.S. PATENT DOCUMENTS

| | | | | |
|---|---|---|---|---|
| 4,047,683 A | * | 9/1977 | Takeuchi | 248/62 |
| 4,479,625 A | * | 10/1984 | Martz | 248/74.1 |
| 6,481,673 B1 | * | 11/2002 | Roe et al. | 248/62 |
| 6,494,415 B1 | * | 12/2002 | Roth | 248/74.1 |

FOREIGN PATENT DOCUMENTS

| | | |
|---|---|---|
| JP | H4107592 | 9/1992 |
| JP | 09014513 | 1/1997 |
| JP | 09079433 | 3/1997 |
| JP | 09079434 | 3/1997 |
| JP | 09079435 | 3/1997 |
| JP | 09152063 | 6/1997 |
| JP | 09217866 | 8/1997 |
| JP | 09317948 | 12/1997 |
| JP | 09317949 | 12/1997 |
| JP | 10026264 | 1/1998 |
| JP | 10238660 | 9/1998 |
| JP | 3058296 | 3/1999 |
| JP | 11182743 | 7/1999 |
| JP | 046244 | 2/2000 |
| JP | 513084 | 10/2000 |
| JP | 050426 | 2/2001 |
| JP | 141117 | 5/2001 |
| JP | 039119 | 2/2002 |

* cited by examiner

Primary Examiner—Ramon O Ramirez
(74) Attorney, Agent, or Firm—Roylance, Abrams, Berdo & Goodman, LLP

(57) ABSTRACT

The present invention provides a fastener for laying pipes which enables providing pipes by a simple work even at a pipe position close to a ceiling, which prevents to detach bolts or nuts from the band using to grasp the pipes, which enables providing pipes even at a construction site where spatial allowance is small on the side of the pipes and below the pipes, and which takes into consideration safety at the time of work. The fastener for laying pipes for which an attachment portion of the band is indirectly or directly attached on a ceiling slab or the like, wherein the band is formed of a material having elasticity, bent portions formed by bending both ends of the band are provided on the lower half portion thereof, and a penetration hole is provided on each of these bent portions, the fastening mechanism for the band is provided into the penetration hole, and the band is either opened or closed on the basis of the attachment portion when the fixing mechanism of the band is not activated.

10 Claims, 13 Drawing Sheets

FIG.1
1-B
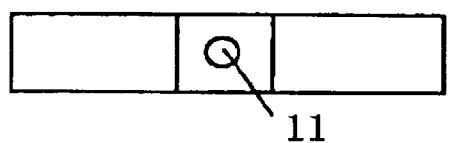
1-C  1-A  1-D
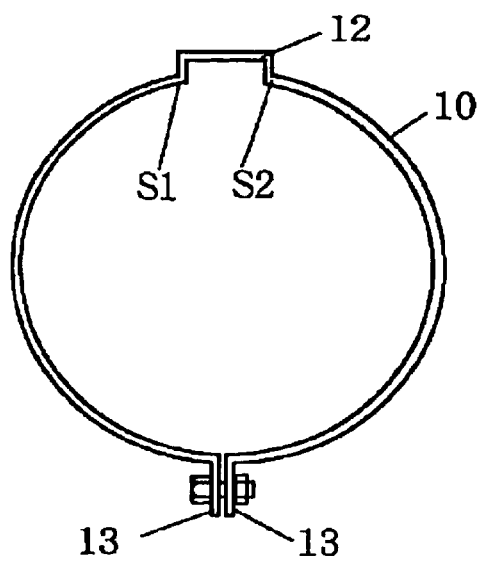
1-E

FIG.2
2 − A
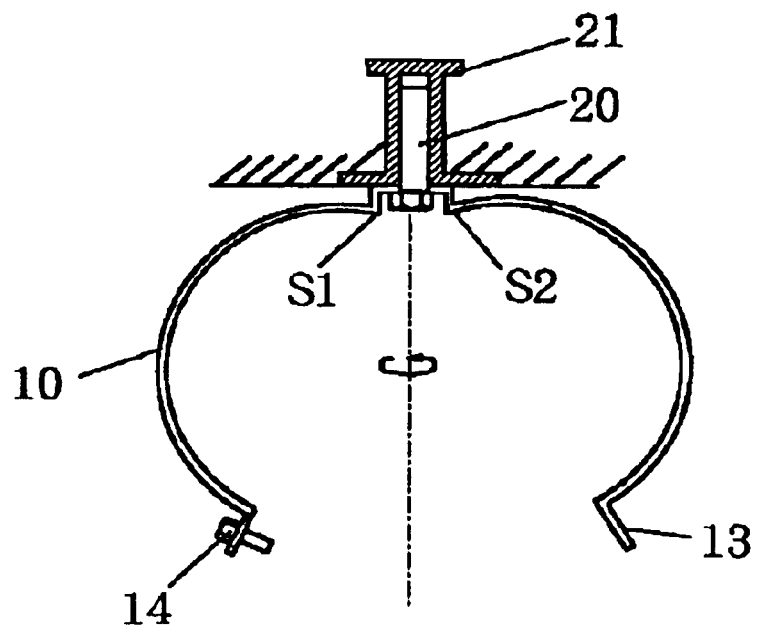
2 − B
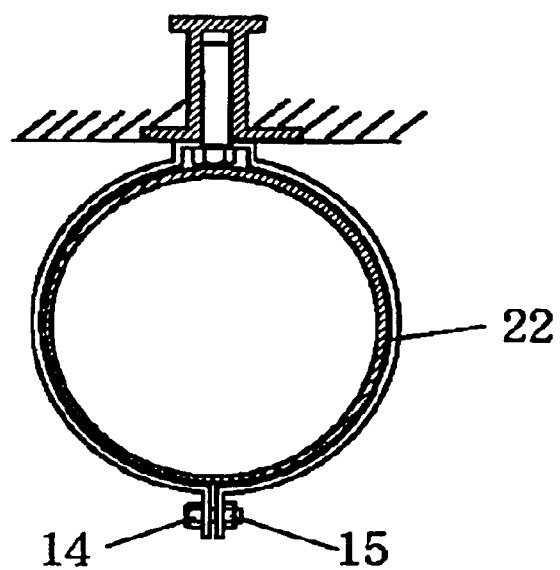

FIG.3
3 – A
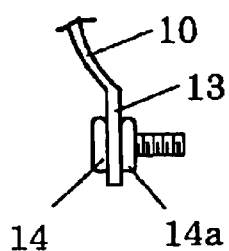
10, 13, 14, 14a
3 – B
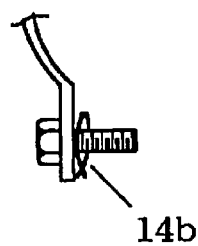
14b
3 – C
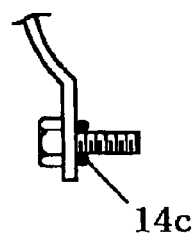
14c
3 – D
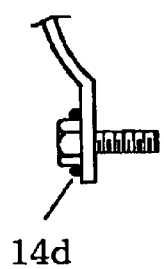
14d
3 – E
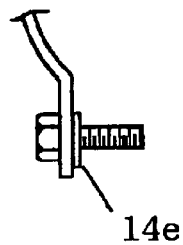
14e

FIG.4
4—A
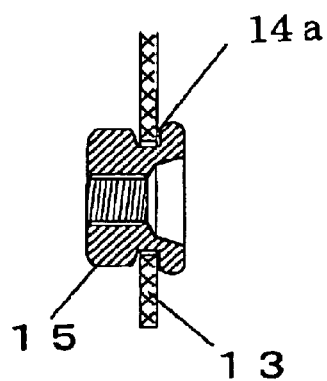
4—B
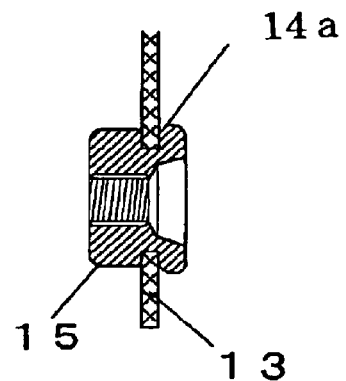
FIG. 7
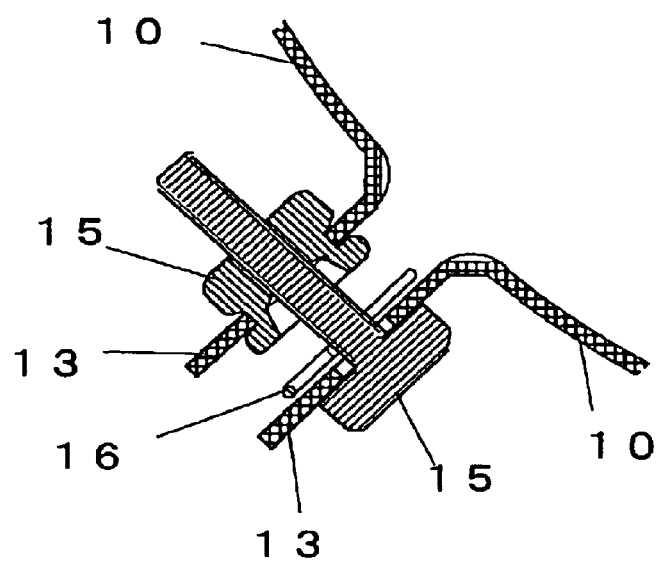

FASTENER FOR LAYING PIPES

BACKGROUND OF THE INVENTION

1. Field of the Invention

The present invention relates to a fastener for laying pipes which is used for laying respective types of pipe such as service water pipes, gas pipes, cooling pipes and heating pipes from a ceiling, hereinafter, it may be abbreviated as a piping fastener.

2. Description of the Prior Art

FIG. 11 shows a general fastener for laying pipes which is conventionally widely used.

The fastener shown in FIG. 11 is used for hanging, suspending or supporting a pipe 8 from a ceiling. In this type of the fastener, a turn buckle 3 which is used to adjust the height or position of the fastener through adjusting position of a nut 2 to the hanger bolt 1 which is suspended from an anchor fixed to the ceiling, and with the result that half bands 5A, 5B for grasping the pipe is fixed to leg portions 3A and 3B of the turn buckle 3 which is suspended and fixed. That is, both ends of the half bands 5A, 5B which are assembled by a hinge mechanism 4 in such a manner that the bands can be freely opened and closed, and which is separated at the right and left are fixed to the bolt 6 and the nut 7 thereby supporting the pipe 8. In the actual work, first, the hanger bolt 1 is attached on the anchor on the ceiling, and subsequently, the piping is attached on this anchor.

At the time of attaching the piping, after the nut 7 is loosened and detached from the bolt 6, and the half band 5B is opened with a hinge mechanism 4 as shown by a dashed line, the pipe 8 is arranged on the inside of the other half band 5A. Thereafter, work is performed for bringing back the detached half band 5B, and fixing the end of this half band 5B to the end of the other half band 5A with the bolt 6 and the nut 7.

At the time of grasping the pipe 8, the half band 5B is already set in a state shown by an imaginary line wherein the half band 5B is opened from the bolt 6 and the nut 7. Thus, the half band 5B is rotated from the state shown by the imaginary line to the state shown by a solid line while grasping the pipe 8 by half band 5A with the result that a circular hole at the end of the half band 5B is inserted into the end of the bolt 6 followed by attaching and fixing the nut 7 to the end of the bolt 6.

The above type of the piping fastener having a turn buckle as shown in FIG. 11 cannot be used, in a case where the position of the piping approaches from the ceiling. That is, it is very difficult to perform fixing with the bolt 6 and the nut 7 in a slight gap between the piping and lower part of the ceiling.

As a technique for solving the above-mentioned problem, a piping fastener having a structure in which an attachment portion to the hanger bolt 1 is provided at the center of the side of one of the half bands 5A and 5B having a half-divided ring-like configuration is described in Registered Utility Model Publication No. 3058296, Unexamined Patent Publication No. H10-238660, Unexamined Patent Publication No. H11-182743 and the Patent Gazette (National Publication of Translated Version) No. 2000-513084.

FIG. 12 shows the piping fastener described in the above-mentioned Registered Utility Model Publication No. 3058296. This piping fastener has a structure in which the half bands 5A and 5B are integrally connected by the hinge mechanism 4, and the half band 5A is attached to the hanger bolt 1 at the attaching position which is settled on the side of the half band 5A, thereby attachment to an anchor (such as an embedded nut or the like) is directly fixed to a ceiling or the like without intervention of the turn buckle as shown in FIG. 11.

In the piping fastener shown in the above-mentioned Japanese Utility Model No. 3058296, since the half bands 5A and 5B are fixed each other on the side position of the pipe 8, the work of fixing the bolt 6 and the nut 7 is difficult despite the presence of a space which allows the hands of a worker to be inserted in the sidewise direction of the pipe 8. That is, since the bolt 6 and the nut 7 are free elements which are separated from and independent of the half bands 5A and 5B, when the nut 7 is detached so as to grasp the piping, it often leads to the detachment of the bolt 6 because of vibration at the time of the work, further, a worker may drop the detached nut 7.

SUMMARY OF THE INVENTION

The present invention has been made in view of the above-mentioned problems. Therefore, a first object of the present invention is to provide a fastener for laying pipes which enables laying pipes by a simple work. A second object of the present invention is to provide a fastener for laying pipes which has mechanism preventing to detach nuts and bolts from the bands.

The inventor of the present invention have continued research on a fastener for laying pipes for solving the above-mentioned problems and have found that the projection portion becomes an obstacle in a case where a spatial allowance below the pipe is small or the head is bumped against the projection portion during work, when the mechanism for fixing the bands is projected in a downward direction. In particular, when the ceiling is low or when the piping position is low or the like, it has been found that there is a fear that the head or the shoulder is contacted when the work is done under the pipes or when the worker passes under the pipes Then, as disclosed in the above-mentioned registered Utility Model Publication No. 3058296, the inventor of the present invention has considered the formation of a structure which is not projected in a downward direction by the location of the mechanism for fixing the bands at the center of the side portion from below. However, in this case, it has been found that the projection portion becomes an obstacle when other pipes and wiring are required to be arranged side by side with each other, or the projection portion becomes an obstacle when it is required to arrange the pipes at a location where the pipes come into contact with the wall and the like.

A third object of the present invention is to provide a fastener for laying pipes which can be arranged at a construction site where spatial allowance is small on the side of the pipes or below the pipes and which takes into consideration safety at the time of work.

BRIEF DESCRIPTION OF THE DRAWINGS

FIG. 1 shows a piping fastener of a first embodiment of the present invention, wherein FIG. 1-A shows a front view, FIG. 1-B a plane view, FIG. 1-C a left side view, FIG. 1-D right side view and FIG. 1-E a bottom view.

FIG. 2 is a partial sectional view showing a usage state of the above-mentioned first embodiment.

FIG. 3 is a partial front view showing five examples of a mechanism for preventing the detachment of bolts.

FIG. 4 is a sectional view of an essential portion showing two examples of the mechanism for preventing the detachment of nuts.

FIG. 7 is an enlarged sectional view showing the mechanism for fixing the band for laying pipes of the above third embodiment.

DETAILED DESCRIPTION OF PREFERRED EMBODIMENTS

Figure 5:
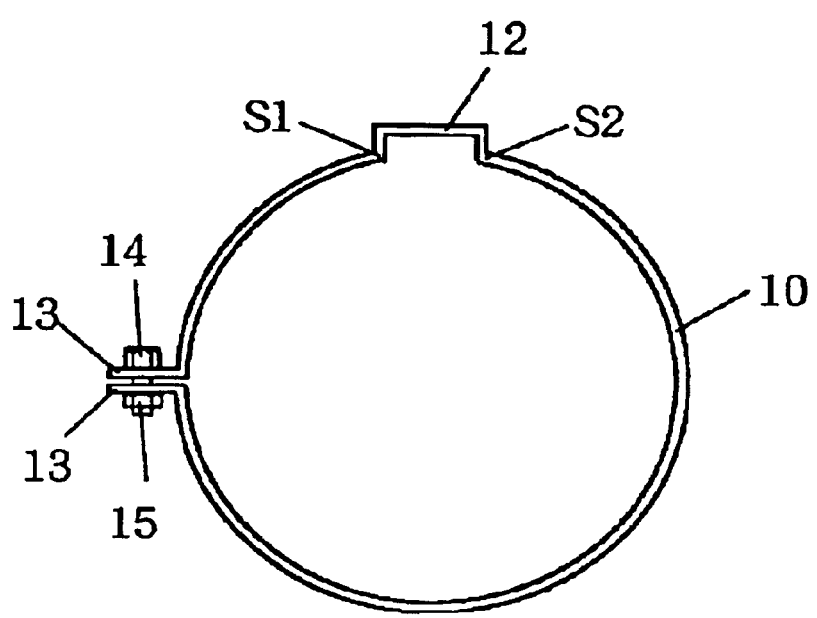
FIG. 5 is a front view showing the piping fastener of a second embodiment of the present invention.

Details of the present invention will be explained according to the accompanied drawings.

First, according to FIGS. 1 to 4, a first embodiment 4 will be explained. In FIG. 1, FIG. 1-A shows a front view, FIG. 1-B a plane view, FIG. 1-C a left side view, FIG. 1-D right side view and FIG. 1-E a bottom view.

This first embodiment has the following structure; a band 10 is formed in a ring-like configuration with a material having elasticity such as a thin plate metal such of as stainless steel or the like and soft synthetic resin. The top portion of the band 10 is bent to prepare an attachment portion 12 on which a penetration hole 11 is formed for a bolt 20 which is used for screwing to the anchor 21 provided on the ceiling. Then, open ends of the band 10 are bent to form bent portions 13 and 13 on which penetration holes are provided for inserting bolts 14 respectively, and bolts 14 and nuts 15 are arranged. These bolts 14 and nuts 15 constitute a mechanism for fixing the open ends of the band 10, and this fixing mechanism and the bent portion 13 are provided on the lower end of the band 10.

Preferably, the band 10 is formed by using stainless steel such as SUS430 (a designation of the Japan Industrial Standard=JIS) or the like. Although the band 10 has elasticity as a whole, the band 10 has to be opened largely at the time of grasping the pipes 22, so that the bent portions formed on bases of the attachment portion 12 constitutes bent support points S1 and S2 (see FIG. 2-A).

At the time of the actual work of laying pipes, as shown in FIG. 2, a bolt 20 is inserted into the penetration hole 11 of the attachment portion 12. This bolt 20 is screwed to the anchor 21 provided on the ceiling. Further, means for fixing the attachment portion 12 to the ceiling is not limited to a configuration of anchors and bolts as shown.

In order to fasten the pipe 22 to the fastener, as shown in FIG. 2, first, the nut 15 is loosened to detach from the bolt 14, and lower ends of the band 10 are largely opened (see FIG. 2-A). The pipe 22 is pushed into an inside space of the band 10 through the open space formed by both ends of the band 10, and then the band 10 is returned to the former figure such as a ring-like configuration by using elasticity of the band 10 thereby fixing the bolt 14 and the nut 15 (see FIG. 2-B).

Figure 11:
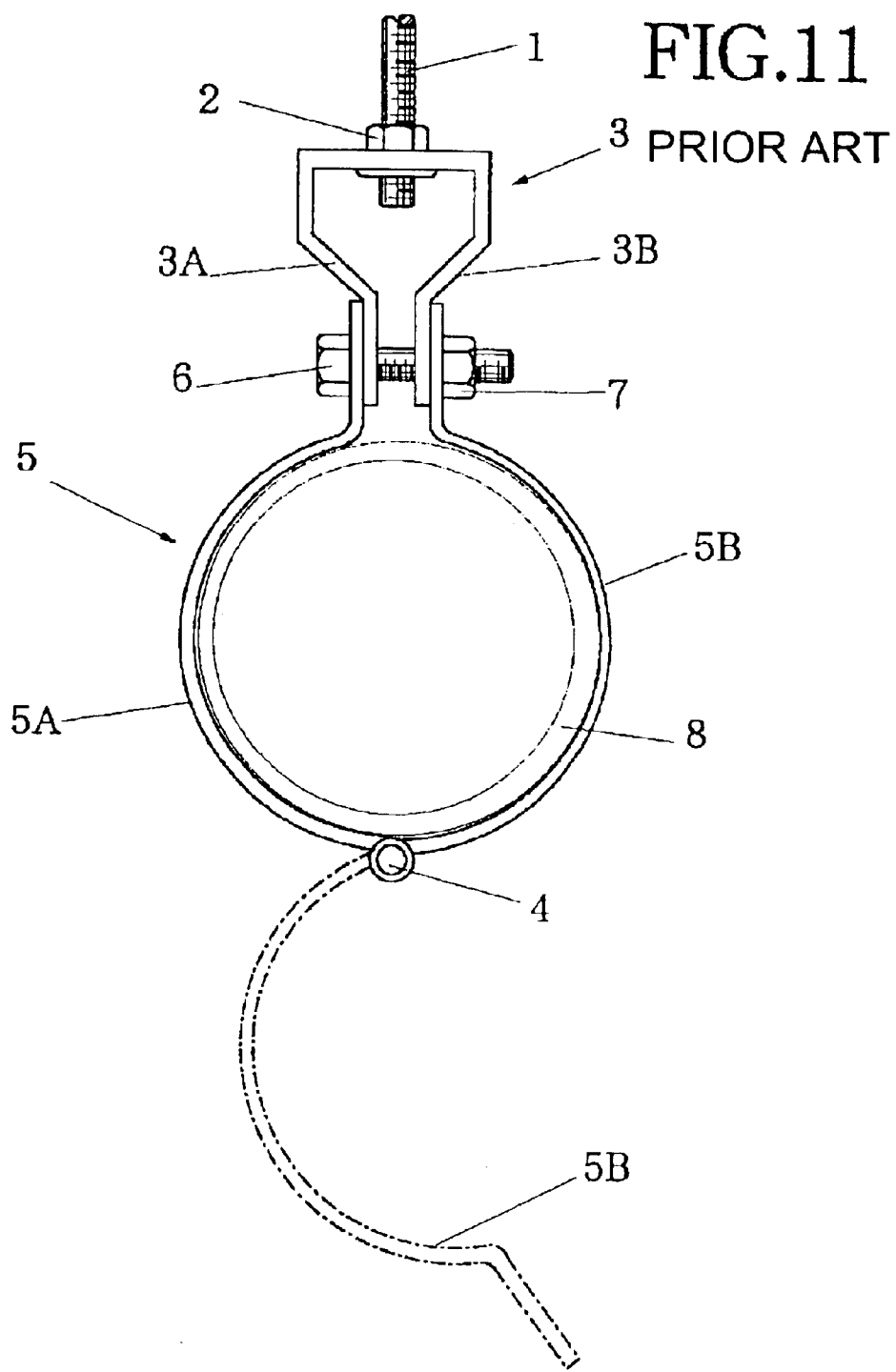
FIG. 11 is a front view showing one example of a conventional product.
Figure 12:
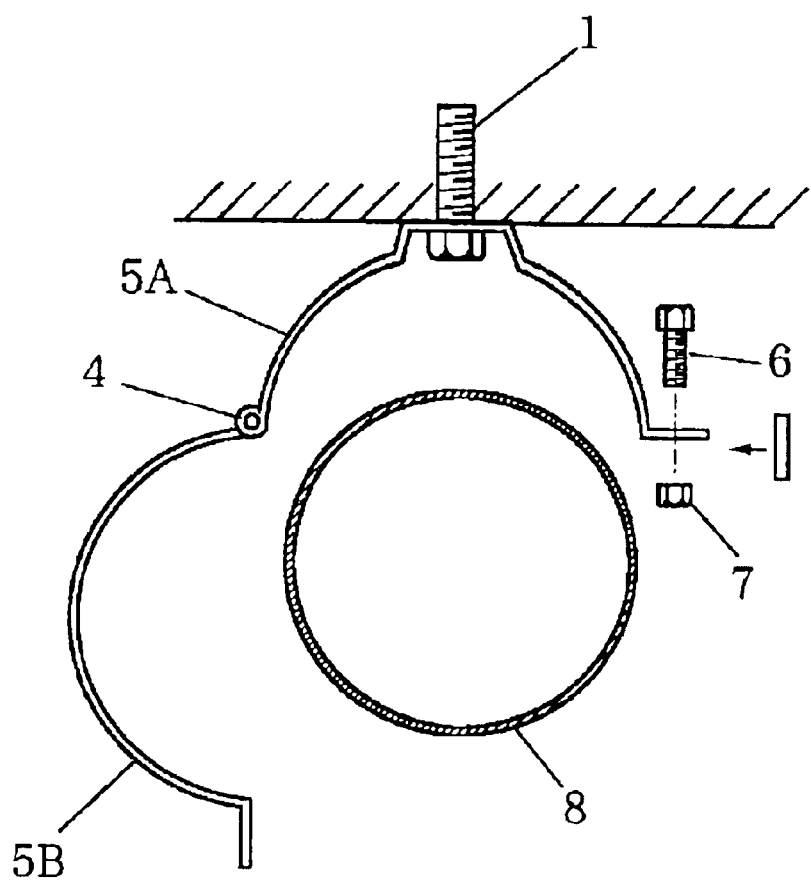
FIG. 12 is a partial sectional front view showing another example of the conventional product.

As described above, in the conventional fastener, as shown in FIGS. 11 and 12, the bolt 14 and the nut 15 constitute free elements which can be separated from and independent of the band 10, so that the detachment of the nut 15 may lead to detachment of the bolt 14 from the penetration hole at the bent portion 13 of the end of the band 10. Consequently, in this structure, a structure is desired in which work is performed for engaging the nut 15 again to the bolt 14 to be fastened by detaching the nut 15 from the bolt 14 and arranging the piping 22 by opening the band 10 in consideration of the fact that the bolt and the nut are not detached therefrom.

Therefore, in the present invention, in order to solve the inferior usage described above, a mechanism for preventing detachment of the bolt and/or the nut is adopted in association with the mechanisms for fixing the ends of the band.

As an example of a mechanism for preventing the detachment thereof, a structure in which only the bolt is prevented from being detached, a structure in which only the nut is prevented from being detached, a structure in which the detachment of both the bolt and the nut are prevented, the nut is fixed with soft caulking of the nut or collar portion of the nut to the band in a rotatable manner, and the bolt is fixed with hard caulking, welding, bonding or the like to the band in an unrotatable manner, and a structure in which the detachment of both the nut and bolts is prevented, the nut is fixed with hard caulking, welding, bonding or the like to the band and the bolt is fixed with the bolt fixing means in a rotatable manner.

FIG. 3 shows five examples to fix the bolt to the band by mechanisms for preventing the detachment. That is, as shown on FIG. 3, the bolt 14 is fixed to one of the bent portion 13 on one side of the band 10, and then the nut 14 is prevented from detaching even when the nut is detached. When specifically explained, the embodiment includes a form in which the head portion of the bolt 14 is caulked to the bent portion 13 of the band 10. (see FIG. 3-A) This form includes a form in which the bolt 14 is tightly caulked so that the bolt 14 does not run idle), a form (see FIG. 3-B) in which the bent portion 13 of the band 10 is sandwiched with a fixture such as a clip or the like for engaging with the head of the bolt 14 and the bolt 14, a form (see FIG. 3-C) in which the bolt 14 is welded or bonded to the bent portion 13 of the band 10, a form (see FIG. 3-D) in which the head of the bolt 14 is welded or bonded to the bent portion 13 of the band 10, and a form (see FIG. 3-E) in which the bolt 14 is fixed with a independent thin nut 14 a. Out of these forms, fixing with caulking as shown in FIG. 3-A, fixing with a fixture such as a clip or the like as shown in FIG. 3-B, and two forms of fixing with a thin nut 14 a shown in drawing 3-E in FIG. 3, the rotation of the bolt is disabled in a case of tight fixing and the rotation of the bolt becomes free in the case of soft fixing.

FIG. 4 shows two examples to fix the nut to the band end by mechanisms for preventing the detachment. FIG. 4-A shows a form in which the nut 15 is fixed rotatably to the bent portion 13 of the band 10 by a soft caulking. FIG. 4-B shows a form in which the nut 15 is fixed unrotatably to the bent portion 13 of the band 10 by a hard caulking. The fixing method of the nut 15 is not limited to the above caulking method. As described above, the nut may be fixed through welding and bonding or other known means, and a nut having a collar portion can be used.

Figure 10:
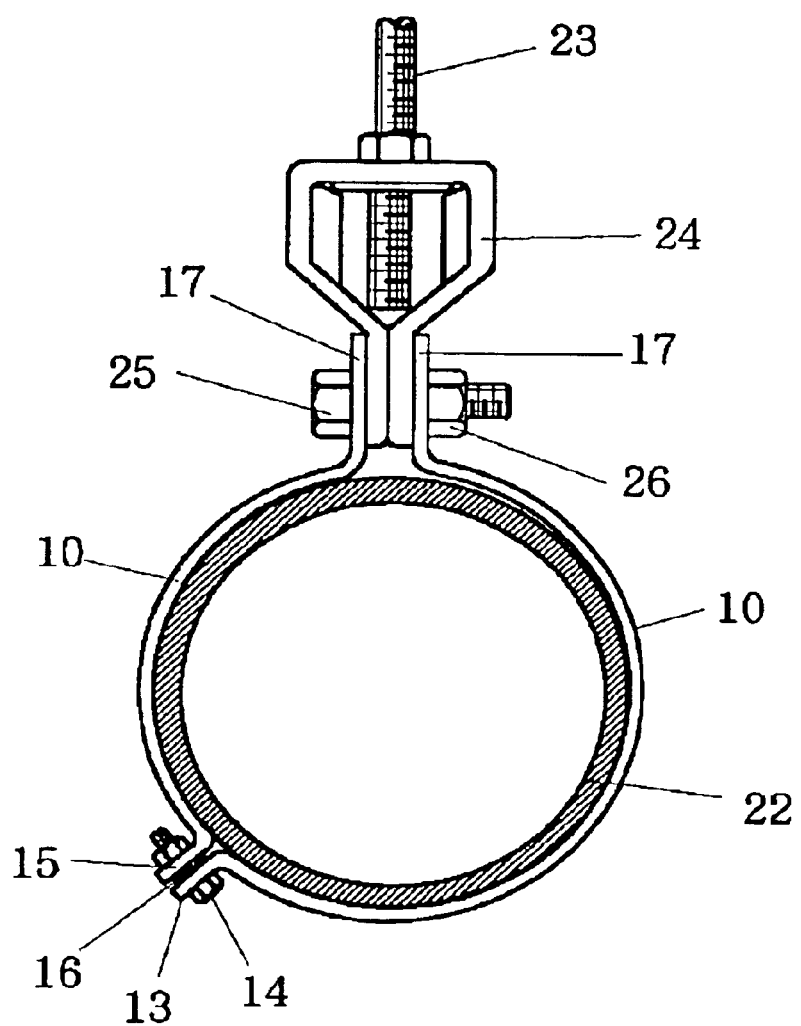
FIG. 10 is partial sectional front view showing the usage state (construction completion) in other forms of the fastener of the above third embodiment.

In the above mentioned first embodiment, the band 10 is formed in a ring-like configuration with sheet material having elasticity, and attachment portion 12 having a penetration hole 11 is prepared on the top portion thereof. However, the present invention is not limited within the above mentioned structures. For example, a turn buckle can be used in place of the attachment portion 12. In this case, as shown in FIG. 10, the top position of the fastener is fixed to the hanger bolt by the bolt and nut through the turn buckle which are vertically provided from an anchor such as a ceiling or the like.

In the case of this embodiment, the band 10 is formed by a pair of belt-like metal each of which is formed into a ring-like configuration, and each upper end of the band is bent to form a penetration hole for fixing the turn buckle, and the bent portions 13 and 13 are formed on the lower ends of the respective bands. The structure of the turn buckle and attachment portion of the band 10 are the same as the turn buckle 24 and attachment portion 17 of the band 10 as shown in FIG. 10.

Next, according to FIG. 5, the second embodiment will be explained.

In this second embodiment, the fastening mechanism is provided on the left end of the ring-like band 10. As described above, in the first embodiment, the same fastening mechanism is provided on the lower end of the ring-like band 10. In the case of the second embodiment, the position of the fastening mechanism is not limited to the left end of the band 10 shown in FIG. 5. The position thereof may be the right end. The position may be appropriately determined in accordance with the situation such as the position of the pipes, other pipes and wiring arranged side by side, or the like.

In the second embodiment as well, the detachment preventing mechanism FIGS. 3 and 4) which is the same as the first embodiment can be adopted. Furthermore, with respect to the attachment portion 12, the turn buckle 24 and attachment portion 17 shown in FIG. 10 described later in the same manner as the first embodiment can be constructed.

According to FIGS. 6 to 9, the third embodiment will be explained.

In the third embodiment, the bolt 14 and the nut 15 as a member of the fixing mechanism of the band are fixed through the fixing mechanism comprising a structure for preventing the detachment from the bent portion 13. As shown in FIG. 7, in this structure, the bolt 14 is prevented by a clip 16 to detach from the nut 15, which is caulked to the bent portion 13. Further, in this third embodiment as well, a structure identical to the first embodiment and second embodiment, namely, a fixing portion is adopted which is provided with a mechanism (FIGS. 3 and 4) for fixing and preventing the detachment with a normal bolt and nut.

Figure 6:
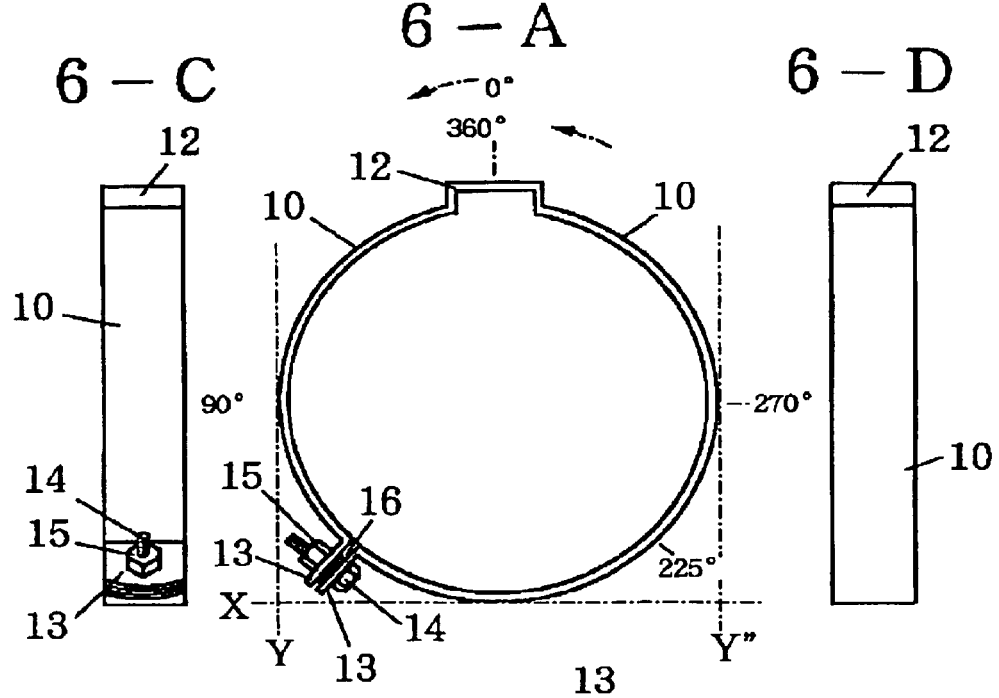
FIG. 6 shows the piping fastener of a third embodiment of the present invention, wherein FIG. 6-A shows a front view, FIG. 6-B a plane view, FIG. 6-C a left side view, FIG. 6-D right side view and FIG. 6-E a bottom view.

As shown in FIG. 6, this third embodiment is characterized in that the bent portion 13 and the fixing mechanism (comprising the bolt 14 and the nut 15) are provided at a position between the lower end and left end (or the right end), and is provided inside of a space portion formed with a horizontal line X contacting a lower end of the ring-like band 10 and a vertical line Y contacting a left end of the ring-like band 10 (or a vertical line Y' contacting the right end), and a ring-like portion of the band 10.

As a specific position, the above-mentioned bent portion 13, and the bolt 14 and the nut 15 are provided at a position within a range of 90° through 180° when the center of the attachment portion 12 is set to 0° or 360°, and at a position at which the bent portion 13 projecting from an outer circumference of the band 10, and the bolt 14 and the nut 15 have a size which allows accommodation inside of the horizontal line X and the vertical line Y (or a vertical line Y'). In particular, a preferable position is a position of 135° (or a position of 225°).

As described above, in the present invention, there is no projection portion to the sidewise and lower direction of the band, because the bent portion 13 and the fastening mechanism (comprising the bolt 14 and the nut 15) are provided inside of a space formed of a horizontal line X contacting the lower end of the band 10, the vertical line Y contacting the ring-like left end (or a vertical line Y' contacting the right end), and a ring-like portion of the band 10. Consequently, pipes can be laid even in the case where spatial allowance is small on the side of the pipes and below the pipes. Besides, it is possible to prevent accidents such as bumping a head or a shoulder against the projection portion at the time of work at a position below the pipes and at the side of the pipes.

Figure 8:
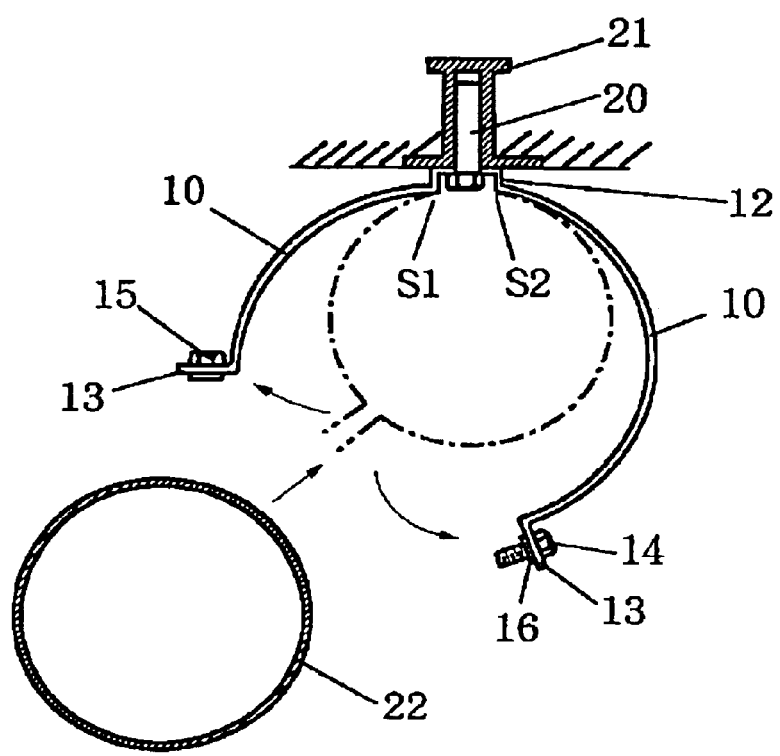
FIG. 8 is a partial sectional front view showing the usage state of the pipes with the fastener of the above third embodiment.
Figure 9:
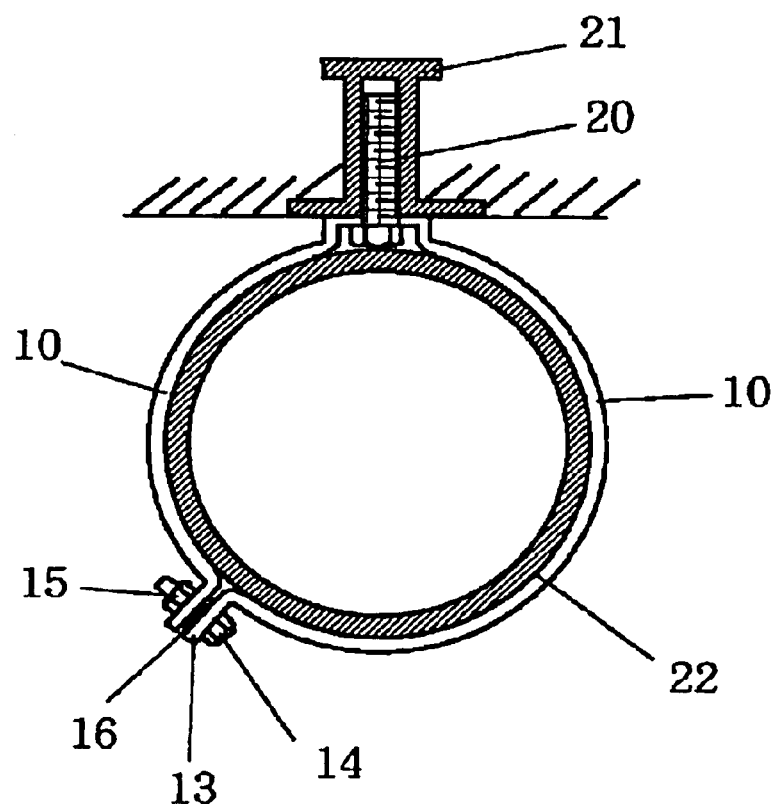
FIG. 9 is a partial sectional front view showing the pipes support state (construction completed) with the fastener of the third embodiment.

At the time of actual work of laying the pipes, as shown in FIG. 8, first, a bolt 20 is inserted into the penetration hole 11 which is prepared at the center of the attachment portion 12, and this bolt 20 is connected to an anchor 21 which is attached to the ceiling. Further, a means for fixing the attachment portion 12 to the side of the ceiling is not limited to a structure comprising the anchor and the bolt as shown.

In order to attach the pipes 22, first, the bolt 14 is loosened, and is detached from the nut 15, and the end of the band 10 is opened. Next, the end of the band 10 is largely opened (see FIG. 8). At this time, the band 10 has elasticity as a whole. At the time of incorporating the pipe 20, the end of the band 10 must be largely opened. Thus, the end of the attachment portion 12 constitutes bending support points S1 and S2 while the band 10 as a whole is flexibly enlarged and opened. Then, the pipe 22 is pushed into the inside space of the band 10 from the open space which is largely opened. Then, the band 10 is brought back to form a ring-like configuration by using elasticity of the fastener, the bolt 14 and the nut 15 are fastened to provide a construction completion state shown in FIG. 9.

As explained above, the fastener for laying pipes according to the third embodiment of the present invention has a structure in which one sheet of a belt-like member is formed into a ring-like configuration with elastic material to form a band 10, and an attachment portion 12 providing the penetration hole 11 for the bolt. However, the present invention is not limited thereto. For example, as shown in FIG. 10, in place of the attachment portion 12 on the top portion of the band 10, an attachment structure is provided which comprises the bolt 25 and nut 26 which is used to fix the bent portions 17 and 17 to the turn buckle 24. The turn buckle 24 is attached to the hanger bolt 23 which is vertically suspended from the anchor of the ceiling. In the case of this embodiment, there is provided a structure in which a pair of belt-like bands 10 and 10 are formed into a ring-like configuration with elastic material, both upper ends of the band 10 are bent to form the bent portions 17 and 17 having a penetration hole for the bolt 25 to fix the ends of the band 10 to the leg portion of the turn buckle 24, and the bent portions 13 and 13 are formed on the each ends of the bands 10 and 10.

Figure 13:
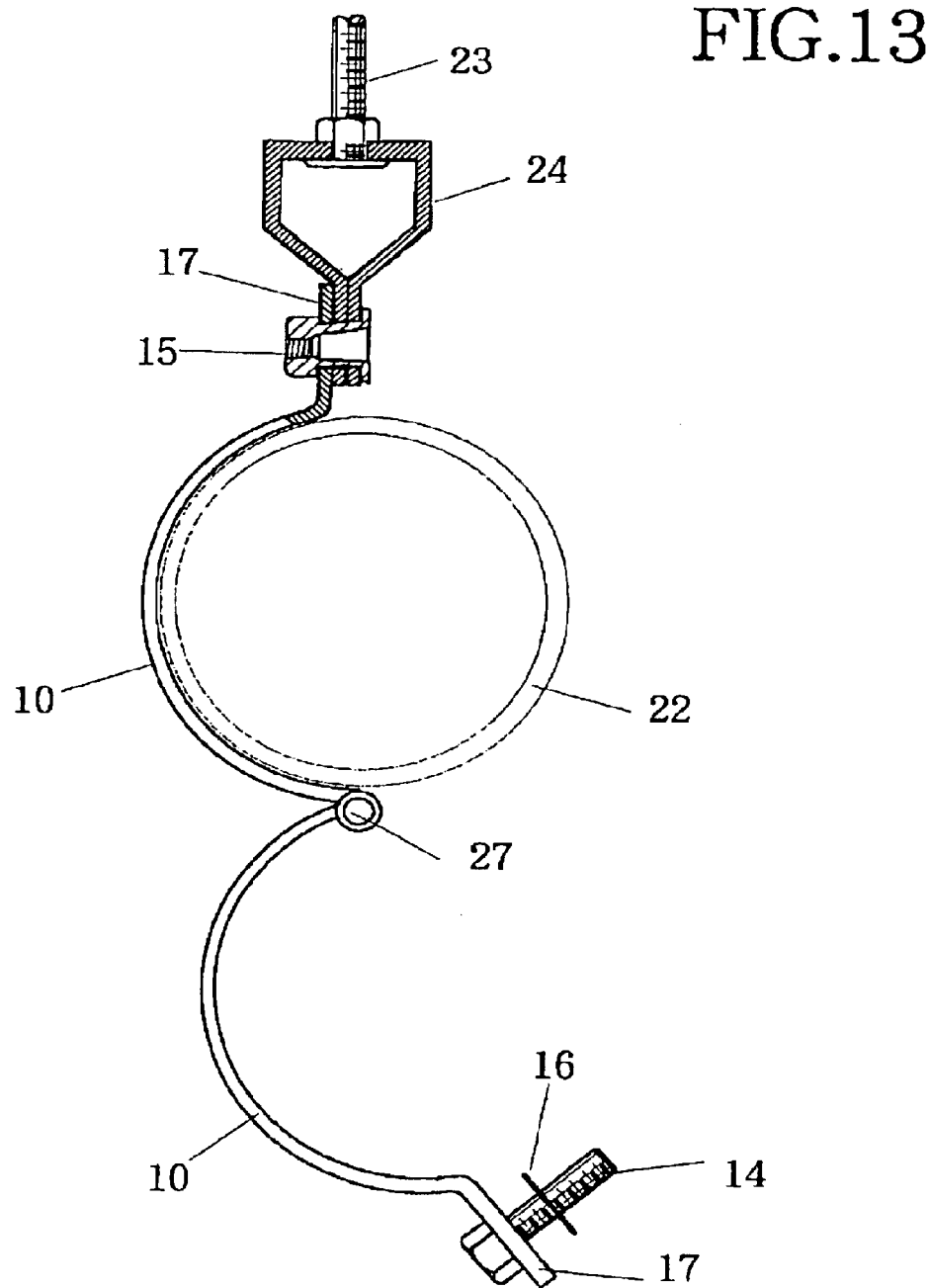
FIG. 13 is a partial sectional front view showing an example in which the fixing mechanism of the present invention is applied to a piping fastener of a suspension type.
Figure 14:
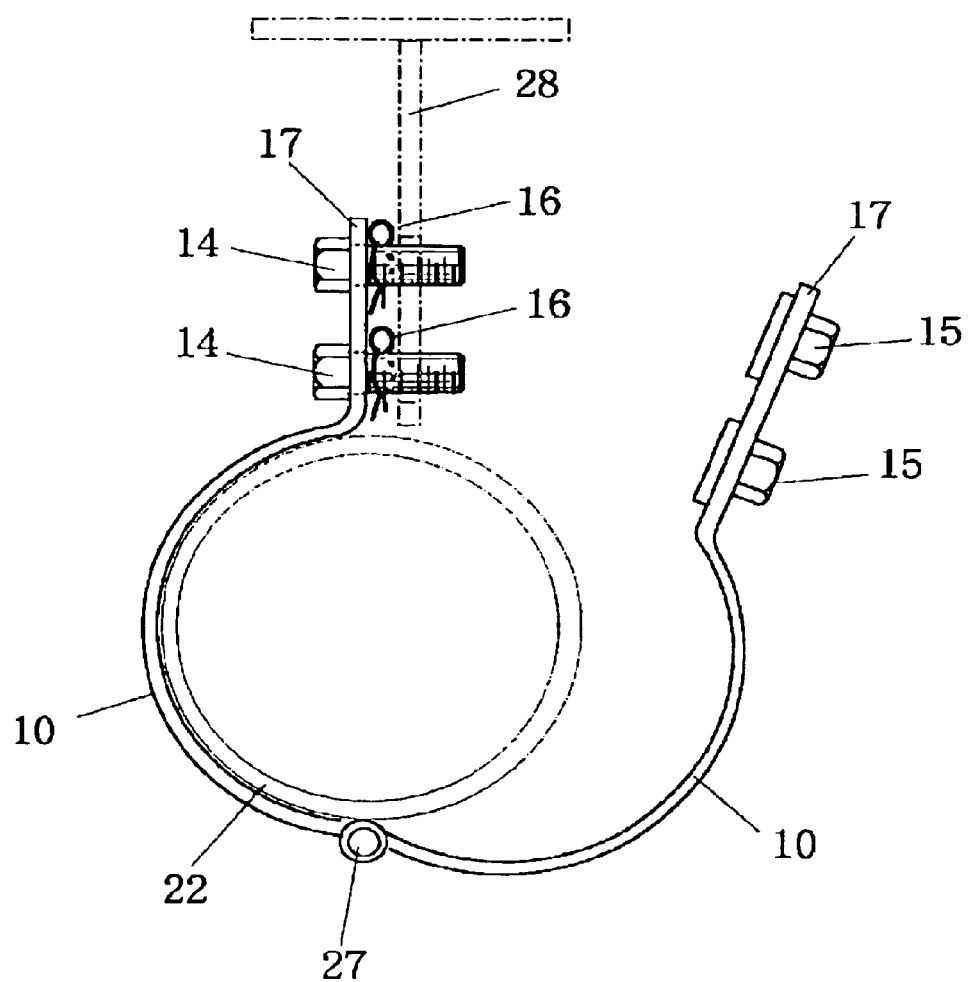
FIG. 14 is a front view showing an example in which the fastening mechanism applied to the present invention is applied to a fastener of a stand type.

The mechanism for fixing the band of the present invention can be applied to the fastener of suspension type (see FIG. 13) and fastener of stand type (see FIG. 14). Hereinafter, this point will be explained below.

That is, as shown in FIG. 13, the mechanism can be applied to the fastener of the suspension type in which the attachment portions 17 and 17 formed on the both ends of the band 10 are fixed to the leg portions of the turn buckle 24 attached to the lower end side of the hanger bolt 23 having one end fixed to the ceiling slab with the bolt 14 and the nut 15. The leg portion at least on one side of the turn buckle 24 and the attachment portion 17 of one of the bands 10 and 10 are connected with caulked nut 15. This nut 15 is fixed in an unrotatable state while the bolt 14 is attached to the other attachment portion 17 of the other band 10 in a state of preventing detachment with a clip 16 for preventing the detachment of the bolt or in a freely rotatable state.

Furthermore, as shown in FIG. 14, the mechanism can be applied to the fastener of stand type which is attached to a stand 28 fixed to the wall surface, the floor or the like, and which is supported in such a manner that the pipe 22 is grasped with a pair of band 10 which are integrated with the hinge mechanism 27 (a set mechanism is also sufficient). On the attachment portion 17 which comprises the end of the band 10 on one side, two bolts 14 are attached in a state in which detachment of the two bolts 14 is prevented with clips 16 and 16 for preventing detachment, and the bolts 14 and 14 can be freely rotated. On the attachment portion 17 which comprises the end of the other band 10, two nuts 15 and 15 are caulked.

According to the present invention, the following technical improvements can be obtained.

First, in the first and second embodiments of the fastener for laying pipes according to the present invention, pipes can be laid even at a position where the pipes are laid in the vicinity of the ceiling. Even when the nut is detached and the bolt is not dropped, the usage is favorable. Furthermore, the belt-like band is formed in a ring-like configuration with elastic material, and the bent portion may only be provided on the end and the attachment portion may be provided on the central portion of the band. Consequently, as compared with a structure (see FIGS. 11 and 12) in which the two bands are connected with the hinge mechanism, the present invention has an advantage in that manufacture is simple, and manufacturing costs are inexpensive.

According to the third embodiment of the present invention, there is provided a structure in which the bent portion and the fixing mechanism is provided inside of the horizontal line contacting the lower end of the fastener, and the vertical line contacting the ring-like left end or the right end. Consequently, the projection portion in a sidewise direction or in a downward direction of the band can be eliminated. Even in a case where spatial allowance is small on the side of the pipes or below the pipes, the pipes can be laid. Furthermore, it is possible to prevent accidents such as bumping of a head and a shoulder against the projection portion at the time of work at a position below the pipe or at the side of the pipe. Consequently, the fastener for laying pipes can be provided which enables laying pipes even in the case where the spatial allowance is small on the side of the pipes and below the pipes and which takes into consideration safety at the time of work.

What is claimed is:

1. A fastener for supporting a pipe, comprising:
   a ring-like one-piece band formed from an elastic and flexible material;
   said band having an attachment portion formed by a projection extending in an upward direction, said projection having a hole to receive a bolt or anchor and to join said attachment portion to a ceiling structure, such that said attachment portion can be directly or indirectly fixed to an anchor fixed to the ceiling structure by a hanger bolt;
   said band having bent portions formed on first and second open free ends thereof, each of said bent portions having a hole therein;
   a coupling assembly including a nut coupled to said first free end and a bolt coupled to said second free end, one of said nut and bolt being coupled to said first bent portion of said band by a soft caulk so that said nut or bolt is rotatable, and the other of said nut and bolt being fixed to said second bent portion by hard caulking, welding or bonding and not rotatable with respect to said second bent portion;
   said band being sufficiently flexible to open and close to insert the pipe into said fastener; and
   said coupling assembly for coupling said first and second ends of said band together being located at a position halfway between a lower edge and a side edge of said band, said bent portions and said coupling assembly being positioned inside a space formed between a horizontal line contacting said lower edge and a vertical line contacting said side edge of said band.

2. The fastener of claim 1, wherein said nut is fixed to said first bent portion of said band and is not rotatable with respect to said first free end; and wherein said bolt is rotatably coupled to said second bent portion of said band.

3. The fastener of claim 1, wherein said bolt is fixed to said first bent portion of said band and is not rotatable with respect to said first free end, and where said nut is rotatably coupled to said second bent portion of said second free end.

4. The fastener of claim 1, wherein said first and second bent portions and said coupling assembly have a dimension to be positioned completely within said space formed by said horizontal line and said vertical line.

5. The fastener of claim 1, wherein said first and second bent portions of said free ends are oriented at an angle of 135° with respect to said projection of said attachment portion.

6. A pipe fastener for supporting a pipe, comprising:
   a turnbuckle for coupling with a hanger bolt extending from a ceiling structure;
   a band formed from a first member having first and second ends and a second member having first and second ends, said first and second members being made of a flexible and elastic material, said first end of said first member having a first bent portion with a hole therein and forming a first attachment portion, said first end of said second member having a first bent portion with a hole therein and forming a second attachment portion, said first and second attachment portions receiving a bolt for fixing said attachment portions to said turn buckle, and said first and second members being sufficiently flexible to open and close to receive a pipe;
   a second bent portion extending from said second end of said first member defining a free end and having a hole formed therein;
   a second bent portion extending from said second end of said second member defining a free end and having a hole formed therein;
   a coupling assembly including a nut and bolt, one of said nut and bolt being coupled to said second bent portion of said first member by a soft caulking such that said nut or bolt is rotatable, and the other of said nut and bolt being fixed to said second bent portion of said second member by a hard caulking, welding or bonding such that said nut or bolt is not rotatable with respect to said second member; and said coupling assembly being positioned halfway between a lower edge and side edge of said band, said second bent portions of said first and second members and said coupling assembly being positioned within a space defined between a horizontal line contacting said lower edge and a vertical line contacting said side edge of said band.

7. The fastener of claim 6, wherein said nut is fixed to said second bent portion of said first member and is not rotatable with respect to said first member, and wherein said bolt is rotatably coupled to said second bent portion of said second member.

8. The fastener of claim 6, wherein said bolt is fixed to said second bent portion of said first member and is not rotatable with respect to said first member, and wherein said nut is rotatably coupled to said second bent portion of said second member.

9. The fastener of claim 6, wherein said second bent portions of said first and second members and said coupling assembly have a dimension to be positioned completely within said space formed by said horizontal line and said vertical line.

10. The fastener of claim 6, wherein said second bent portions of said first and second members are oriented at an angle of 135° with respect to said first and second attachment portions.

* * * * *